United States Patent
Viswanath et al.

(10) Patent No.: US 8,046,430 B2
(45) Date of Patent: *Oct. 25, 2011

(54) LOAD BALANCING NETWORK ACCESS REQUESTS

(75) Inventors: Kaartik Viswanath, Santa Clara, CA (US); Jayaraman R. Iyer, Sunnyvale, IN (US); Marco C. Centemeri, Rho (IT); Wen-Lin Tsao, Fremont, CA (US); Laurent Andriantsiferana, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/236,168

(22) Filed: Sep. 23, 2008

(65) Prior Publication Data

US 2009/0016292 A1    Jan. 15, 2009

Related U.S. Application Data

(63) Continuation of application No. 11/627,415, filed on Jan. 26, 2007, now Pat. No. 7,447,774, which is a continuation of application No. 10/229,492, filed on Aug. 27, 2002, now Pat. No. 7,185,067.

(51) Int. Cl.
    *G06F 15/16* (2006.01)
(52) U.S. Cl. .................. 709/217; 709/219
(58) Field of Classification Search .......... 709/217, 709/219, 226, 238–242; 370/351; 455/428, 455/453
See application file for complete search history.

(56) References Cited

U.S. PATENT DOCUMENTS

| | | | | |
|---|---|---|---|---|
| 5,951,694 A | | 9/1999 | Choquier et al. | 714/15 |
| 6,016,509 A | * | 1/2000 | Dedrick | 709/224 |
| 6,018,522 A | | 1/2000 | Schultz | 725/86 |
| 6,119,143 A | * | 9/2000 | Dias et al. | 709/201 |
| 6,141,684 A | * | 10/2000 | McDonald et al. | 709/222 |
| 6,175,879 B1 | * | 1/2001 | Shah et al. | 719/330 |
| 6,351,775 B1 | * | 2/2002 | Yu | 709/238 |
| 6,496,505 B2 | | 12/2002 | La Porta et al. | 370/392 |
| 6,504,839 B2 | | 1/2003 | Valentine et al. | 370/354 |
| 6,711,147 B1 | | 3/2004 | Barnes et al. | 370/338 |
| 6,853,642 B1 | | 2/2005 | Sitaraman et al. | 370/395.4 |
| 6,904,018 B2 | * | 6/2005 | Lee et al. | 370/238 |
| 6,959,436 B2 | | 10/2005 | Peng | 719/310 |

(Continued)

OTHER PUBLICATIONS

ETSI, "Draft ETSI EN 301 347 v7.3.0 (Jan. 2000); Digital cellular telecommunications system (Phase 2+); General Packet Radio Service (GPRS); GPRS Tunnelling Protocol (GTP) across the Gn and Gp Interface (GSM 09.60 version 7.3.0 Release 1998)," European Telecommunications Standards Institute, pp. 1-69, 2000.

*Primary Examiner* — Ario Etienne
*Assistant Examiner* — Sargon Nano
(74) *Attorney, Agent, or Firm* — Baker Botts L.L.P.

(57) ABSTRACT

A method of load balancing network access requests comprises receiving a network access request from a serving node linked to a radio access network. The network access request identifies a mobile node receiving wireless service from the radio access network and identifies a data network to which the mobile node has requested access. The network access request requests a communication channel with the serving node for transporting data communications between the mobile node and the data network. The method further comprising determining one or more gateways providing access to the data network, selecting one of the gateways, and forwarding the network access request to the selected gateway.

9 Claims, 2 Drawing Sheets

U.S. PATENT DOCUMENTS

| | | | |
|---|---|---|---|
| 7,003,555 B1 | 2/2006 | Jungck | 709/219 |
| 7,020,090 B2 | 3/2006 | Chandwadkar et al. | 370/249 |
| 7,035,895 B1 | 4/2006 | Hooper et al. | 709/201 |
| 7,043,525 B2 | 5/2006 | Tuttle et al. | 709/203 |
| 7,284,268 B2 * | 10/2007 | Schmidt et al. | 726/11 |
| 7,502,836 B1 * | 3/2009 | Menditto et al. | 709/217 |
| 7,512,702 B1 * | 3/2009 | Srivastava et al. | 709/238 |
| 7,673,007 B2 * | 3/2010 | Mulligan et al. | 709/207 |
| 7,734,908 B1 * | 6/2010 | Kung et al. | 713/153 |
| 7,751,409 B1 * | 7/2010 | Carolan | 370/395.53 |
| 2002/0133600 A1 * | 9/2002 | Williams et al. | 709/228 |

* cited by examiner

LOAD BALANCING NETWORK ACCESS REQUESTS

CROSS-REFERENCE TO RELATED APPLICATION

This application is a continuation of U.S. application Ser. No. 11/627,415 filed Jan. 26, 2007 and entitled "Load Balancing Network Access Requests" which is a continuation of U.S. application Ser. No. 10/229,492 filed Aug. 27, 2002 and entitled "Load Balancing Network Access Requests" now U.S. Pat. No. 7,185,067 which issued Feb. 27, 2007.

TECHNICAL FIELD OF THE INVENTION

This invention relates in general to wireless access to data networks and, more particularly, to load balancing network access requests.

BACKGROUND OF THE INVENTION

High-speed, wireless networks provide mobile devices with access to data networks, such as the internet. Similar to "traditional" internet navigation, mobile devices request access to these networks using text-based network names, referred to as access point names (APNs). Operator networks support wireless communications with mobile devices and link mobile devices to other networks based on the APNs requested.

SUMMARY OF THE INVENTION

In accordance with the present invention, techniques for load balancing network access requests are provided.

According to one example of the present invention, a method of load balancing network access requests comprises receiving a network access request from a serving node linked to a radio access network. The network access request identifies a mobile node receiving wireless service from the radio access network and identifies a data network to which the mobile node has requested access. The network access request requests a communication channel with the serving node for transporting data communications between the mobile node and the data network. The method further comprising determining one or more gateways providing access to the data network, selecting one of the gateways, and forwarding the network access request to the selected gateway.

Certain embodiments of the invention provide one or more technical advantages. These techniques permit load balancing across differently configured gateway generalized packet radio service (GPRS) support nodes. This can ease management of network equipment. Particular embodiments can be implemented without modifying existing equipment, such as serving and gateway GPRS support nodes. Certain embodiments leverage the operation of domain name servers to load balance requests, thus providing for the quick and effective load balancing of network access requests.

Other technical advantages will be readily apparent to one skilled in the art from the following figures, descriptions and claims. Moreover, while specific advantages have been described above, various embodiments may include none, some, or all of the enumerated technical advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
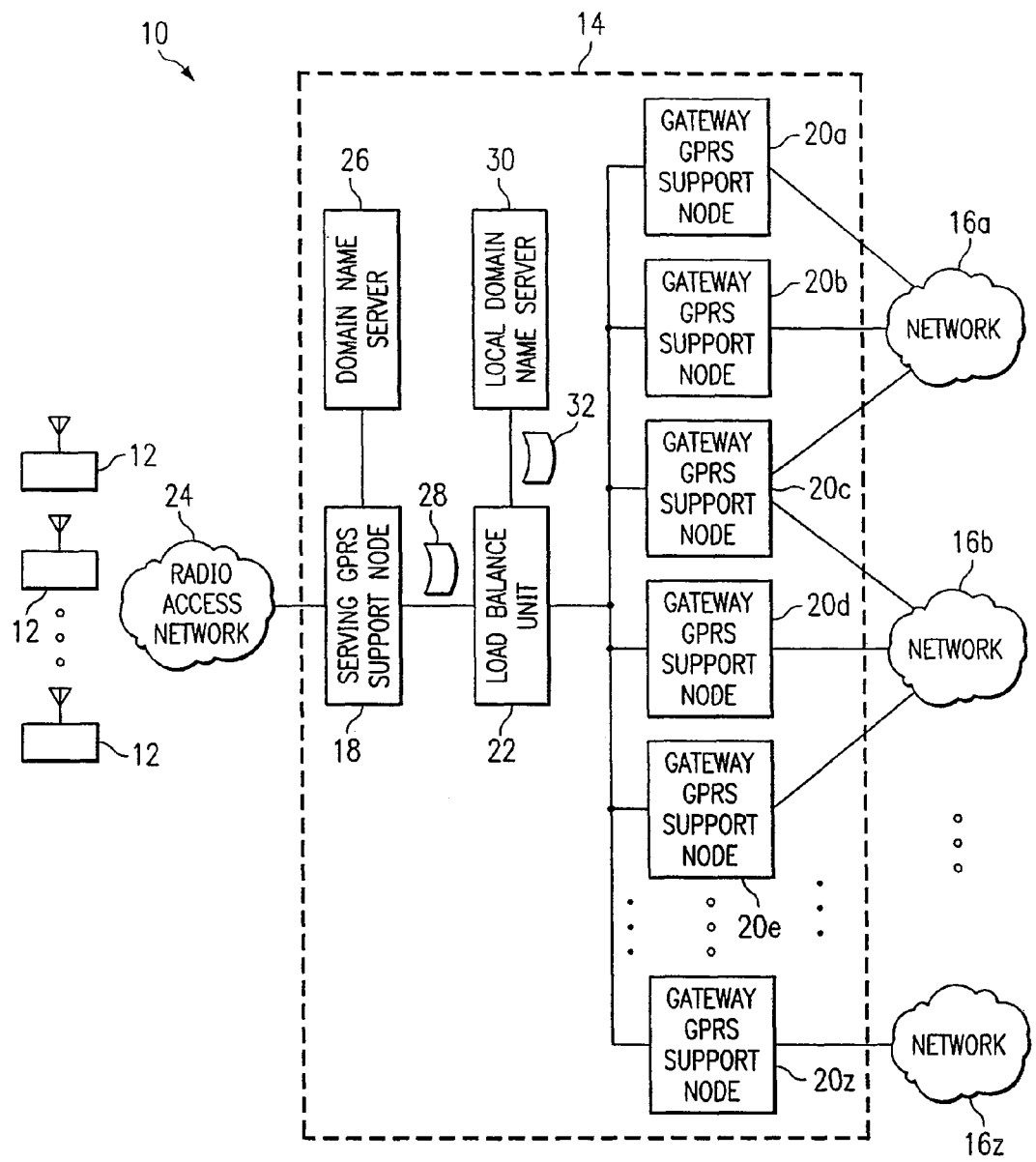
FIG. 1 illustrates a system that provides load balancing of network access requests from mobile nodes according to particular embodiments of the present invention.

FIG. 1 illustrates a system 10 that supports wireless communication for mobile nodes 12 and provides mobile nodes 12 access to various data networks 16. In the embodiment illustrated, system 10 includes a radio access network (RAN) 24, an operator network 14, and one or more data networks 16. Operator network 14 uses a serving node 18 to link RAN 24 with multiple gateways 20 providing access to data networks 16. During operation, mobile nodes 12 request access to data networks 16. A load balance unit 22 within operator network 14 distributes these requests to balance the loads of gateways 20.

Mobile nodes 12 support wireless communications for voice and/or data services. Mobile nodes 12 may comprise, for example, cellular telephones, personal computers, personal digital assistants, mobile handsets, or any other devices suitable for wireless communications. To gain access to data services, mobile node 12 generates a request that identifies the particular data network 16 with which mobile node 12 desires service. The request may identify requested data network 16 by an access point name (APN) associated with requested data network 16. In particular embodiments, the APN may be a text-based identifier that is entered by the user of mobile node 12.

RAN 24 provides wireless services for voice and data access of mobile nodes 12 communicating with RAN 24. According to particular embodiments, RAN 24 includes towers and other supporting equipment to facilitate communication between mobile nodes 12 and data networks 16. Data networks 16 each include any collection or arrangement of elements providing data services to mobile nodes 12. For example, data networks 16 may include public and/or private corporate networks, the Internet, or other networks providing packet-based services.

Operator network 14 links RAN 24 with multiple data networks 16 to provide mobile nodes 12 access to packet-based services. In the embodiment illustrated, operator network 14 includes a serving node 18, a domain name server 26, a load balance unit 22, a local domain name server 30, and multiple gateways 20. Operator network 14 receives the network access requests generated by mobile nodes 12 and processes the network access requests to select a gateway 20 to which the network access request should be forwarded, to determine a destination address associated with the selected gateway 20, and to verify that mobile node 12 has authority to obtain access to the requested data networks 16.

To provide a mobile node 12 access to a data network 16, serving node 18 forms a communication channel with one of gateways 20 linking to requested data network 16. According to one embodiment, serving node 12 supports data communication between mobile node 12 and requested data network 16 using generalized packet radio service (GPRS) protocols. Thus, serving node 18 may be, for example, a serving GPRS support node (SGSN). To provide mobile node 12 access to one of data networks 16, serving node 18 generates a network access request 28 based on information received from mobile node 12. According to particular embodiments, network access request 28 is a packet specifying a create packet data protocol (PDP) context request, which includes information elements such as the requested APN, mobile node identifiers, international mobile subscriber identities, techniques for authentication and other appropriate information. The packet further includes a header that specifies a source and destination address for the packet. For example, the packet header may indicate an internet protocol (IP) address for serving node 18 and a destination IP address determined using the domain name of requested data network 16 such as the APN specified by mobile node 12.

To determine the best address, serving node 18 accesses domain name server 26 to request an IP address associated with the domain name of requested data network 16. Domain name server 26 translates the domain name into an IP address and returns this address to serving node 18. According to particular embodiments, to permit load balancing of network access, domain name server 26 is configured to return the IP address of load balance unit 22 when presented with a domain name for one of data networks 16.

Because operator network 14 may include many gateways 20 and because multiple gateways 20 may communicate with each data network 16, load balance unit 22 balances network access requests among gateways 20. Upon receiving network access request 28, load balance unit 22 determines one or more gateways 20 providing access to requested data network 16 and selects one of these gateways 20 to which to forward network access request 28. To identify gateways 20 that link to requested data network 16, load balance unit 22 accesses a local domain name server 30 using the domain name of requested data network 16. Similar to domain name server 26, local domain name server 30 translates domain names into IP addresses. However, while domain name server 26 maps domain names to load balance unit 22, local domain name server 30 maps these domain names to appropriate gateways 20.

Gateways 20 link operator network 14 to data networks 16 and perform protocol conversions and translations as appropriate. According to particular embodiments, gateways 20 terminate the mobile portion of calls established by mobile nodes 12. For example, gateways 20 handle roaming, handoffs, and other features such that data networks 16 are unaware of the mobile nature of the communications. Gateways 20 may, for example, support GPRS protocols. As such, gateways 20 may be gateway GPRS serving nodes (GGSNs). According to particular embodiments, gateways 20 provide mobile nodes 12 access to data networks 16 by forming communication channels with serving node 18. For example, after receiving and validating network access request 28, gateway 20 may form a tunnel with serving node 18 using GPRS tunneling protocol (GTP). This tunnel then transports packets between mobile node 12 and data network 16 across operator network 14.

During operation, mobile nodes 12 generate requests for access identifying particular ones of data networks 16 to which mobile nodes 12 desire access. For example, in response to user selections, one of mobile nodes 12 generates a request that identifies the APN of a requested data network 16. The request propagates via RAN 24 to operator network 14, where serving node 18 receives the request. Upon receiving the request, serving node 18 creates network access request 28. As previously discussed, network access request 28 includes a header specifying destination and source IP addresses and includes data fields specifying information such as the APN for the requested data network 16, mobile node identifiers, international mobile subscriber identities, techniques for authentication and/or other suitable information. Authentication techniques enable operator network 14 to identify and authorize the user of mobile node 12 before allowing the user to access requested data network 16 and network services. Thus, at some point before data service is established, the user may be required to manually or verbally input into mobile node 12 a user identifier and password.

Serving node 18 accesses domain name server 26 using the APN for requested data network 16 to determine the destination IP address for network access request 28. As previously discussed, domain name server 28 is configured to return the IP address of load balance unit 22 in response to requests identifying a domain name associated with one of data networks 16. Serving node 18 uses the returned IP address as the destination address in network access request 28. After creating network access request 28, serving node 18 transmits network access request 28 to load balance unit 22 identified by the destination IP address.

To provide load balancing of network access, load balance unit 22 identifies one or more gateways 20 providing access to requested data network 16 and selects one of these gateways 20. In the embodiment illustrated, load balance unit 22 accesses local domain name server 30 to determine gateways 20 providing access to requested data network 16.

In response to a request from load balance unit 22 identifying the APN, local domain name server 30 formulates a list 32 of gateways 20 that link to the identified APN. In the illustrated embodiment, operator network 14 includes gateways 20a, 20b, and 20c that communicate with and provide access to data network 16a. If, for example, network access request 28 identifies data network 16a as the requested network, local domain name server 30 returns list 32 identifying gateways 20a, 20b, and 20c as possible paths for accessing the identified network. Similarly, if network access request 28 identifies data network 16b as the requested network, local domain name server 30 will generate list 32 identifying gateways 20c, 20d, and 20e. According to the illustrated embodiment, a network access request 28 identifying data network 16z as the requested network may generate a list 32 identifying only gateway 20z. The configuration of gateways as shown in FIG. 1, however, is merely exemplary. Any number of gateways 20 may communicate with any number of data networks 16. Operator network 14 is not intended to be limited to the configuration illustrated in FIG. 1.

According to particular embodiments, local domain name server 30 orders identified gateways 20 in subsequently generated lists using a round-robin technique. If, for example, the APN identifies data network 16a as the requested network, the list returned by local domain name server 30 identifies in consecutive order: gateway 20a, gateway 20b, and gateway 20c. In response to the next network access request 28 identifying the same APN, local domain name server 30 returns a list identifying in consecutive order: gateway 20b, gateway 20c, and gateway 20a. In response to a third request 28 for access to data network 16a, local domain name server 30 returns a list specifying: gateway 20c, gateway 20a, and gateway 20b. In round-robin fashion, a fourth request 28 for access to data network 16a would result in a list identical to the first list described above, provided that local domain name server 30 identifies no change in the particular gateways 20 providing access to data network 16a. However, while this example demonstrates a round-robin technique, system 10 contemplates local domain name server 30 using any suitable techniques for generating a response indicating gateways 20 that provide access to an identified APN.

After generating list 32, local domain name server 30 communicates list 32 to load balance unit 22. Load balance unit 22 uses list 32 to select a gateway 20 to which to forward network access request 28. If list 32 is created using a round-robin method or some other alternating method of ordering, load balance unit 22 may select the first gateway 20 listed. By selecting the first gateway 20 on list 32, load balance unit 22 distributes network access requests 28 that identify the same requested data network 16 among appropriate gateways 20, since each successive network access request 28 results in a different first gateway 20 in the list. However, system 10 contemplates load balance unit 22 using any suitable techniques and information to select between gateways 20 identified by local domain name server 30.

After selecting one of the identified gateway 20, load balance unit 22 forwards network access request 28 to the selected gateway 20. As part of the forwarding process, load balance unit 22 may modify the header of network access request 28 such that the IP address of the selected gateway 20 is stored as the new destination IP address. If load balance unit 22 maintains the IP address of serving node 18 as the source address, network access request 28 appears to the selected gateway 20 as if sent directly from serving node 18. Thus, the operation of load balance unit 22 within system 10 may be transparent to serving node 18 and gateways 20.

Upon receiving network access request 28, gateway 20 verifies the authenticity of the user and, if appropriately authenticated, establishes a communication channel between mobile node 12 and requested data network 16. Verification of the authenticity of the user may include performing particular authentication and authorization techniques as identified in network access request 28. If, for example, network access request 28 specifies that login and password dialog should be used, gateway 20 may verify the user identifier and/or password as input by the user at mobile node 12. As previously discussed, the user identifier and password may also be included in network access request 28.

After gateway 20 verifies that the user may gain access to requested data network 16, gateway 20 and serving node 18 form a communication channel or tunnel to transport packets across operator network 14. As previously discussed, where serving node 18 and gateway 20 support communication using GPRS, the communication channel may be a GTP tunnel providing a secure, temporary path over operator network 14. Alternatively, any other suitable tunneling protocols, such as IP Security, Layer 2 Tunneling Protocol, Point-to-Point Tunneling Protocol, and SOCKSv5, may be used. Because the operation of load balance unit 22 is transparent to serving node 18 and gateway 20, they may use standard techniques to create this tunnel. Moreover, load balance unit 22 need not participate in the creation, use, or removal of these tunnels.

Figure 2:
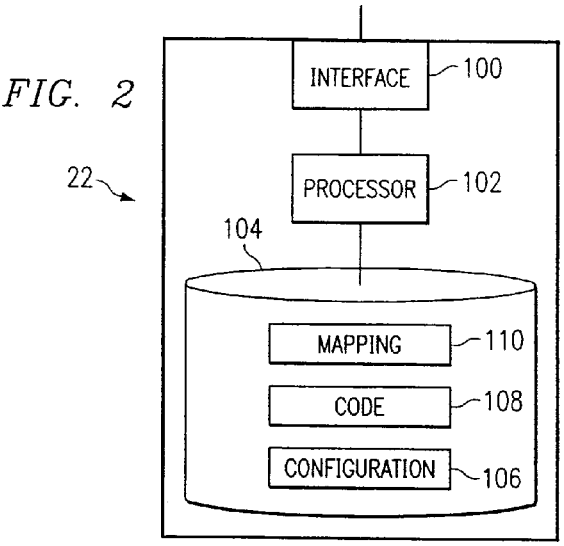
FIG. 2 illustrates an example load balancing unit from the system.

FIG. 2 illustrates an example load balance unit 22. In the embodiment illustrated, load balance unit 22 includes an interface 100, a processor 102, and a memory 104. Load balance unit 22 enables operator network 14 to balance traffic among gateways 20. During operation, load balance unit 22 receives network access requests 28 from serving node 18 and distributes these network access requests 28 to balance the loads of gateways 20.

Load balance unit 22 includes at least one interface 100 for receiving and transmitting packets with other elements of operator network 14. Although a single interface 100 may communicate with multiple elements of operator network 14, load balance unit 22 may include multiple interfaces 100 and each interface 100 may communicate with a specific element of operator network 14. Load balance unit 22 also includes processor 102, which controls the management and operation of load balance unit 22 by accessing information stored in memory 104 and using interface 100 to communicate with other elements of operator network 14. In particular embodiments, processor 102 receives network access requests 28 and lists 32, maintains information in memory 104, and performs load balancing functions to distribute network access requests 28 to appropriate gateways 20.

Memory 104 includes information for configuring and operating load balance unit 22 to support the process of load balancing network access requests 28. In the illustrated embodiment, memory 104 stores configuration information 106, code 108, and mapping information 110. Configuration information 106 includes the IP address of local domain name server 30, time out values, and/or any other appropriate information for use by load balance unit 22. Code 108 includes logic that enables processor 102 to perform functions such as selecting gateway 20 from list 32 and maintaining mapping information 110. Mapping information 110 includes information regarding previous network access requests 28 by mapping mobile node identifiers to previously selected gateways 20. Mapping information 110 permits load balance unit 22 to identify retransmitted network access requests 28 and to forward these network access requests 28 to gateways previously selected to service network access requests 28.

In operation, interface 100 receives network access request 28 from serving node 18. As previously discussed, network access request 28 identifies an APN and the requesting mobile node 12, and includes other information appropriate for the processing of network access request 28. In particular embodiments, processor 102 may generate an entry in mapping information 110 upon receiving network access request 28. The entry may include, for example, the mobile node identifier associated with mobile node 12 requesting access to data network 16, the APN of the requested data network 16, and a time stamp indicating when the entry was generated.

Processor 102 accesses configuration information 106 and retrieves the IP address of local domain name server 30. Processor 102 then accesses local domain name server 30 via interface 100 to determine the addresses of gateways 20 providing access to requested data network 16. As described above with regard to FIG. 1, local domain name server 30 generates a list 32 of such gateways 20 and may order the gateways 20 in list 32 using round-robin or some other alternating selection technique. Accordingly, two different network access requests 28 for the same requested data network 16 may result in two lists 32 comprising the same three gateways 20; however, the order in which gateways 20 are listed may vary.

Upon receiving list 32 of gateways 20 providing access to requested data network 16, processor 102 selects one of these gateways 20 to provide mobile node 12 access to requested data network 16. According to particular embodiments, where list 32 is generated using round-robin or other alternating techniques, processor 102 selects the first gateway 20 identified in list 32. By selecting the first gateway 20 on list 32, processor 102 distributes successive network access requests 28 identifying the same requested data network 16 among gateways 20. After selecting gateway 20, load balance unit 22 modifies network access request 28 to include the IP address of the selected gateway 20 as the destination IP address.

Before or after transmitting network access request 28 to selected gateway 20, load balance unit 22 may update the previously generated entry for the particular network access request 28 in memory 104 to reflect the selected gateway 20. However, although processor 102 is described as generating the entry in mapping information 110 prior to receiving list 32 from local domain name server 30, processor 102 may also be configured to generate the entry after list 32 is received and gateway 20 is selected from list 32. Thus, processor 102 may store the mobile node identifier, the APN identifying requested data network 16, the selected gateway 20, and/or any other information appropriate for processing and load balancing network access request 28 at one time. In this manner, the need for updating the entry in mapping information 110 later is eliminated.

Mapping information 110 permits load balance unit 22 to handle retransmissions of a network access request 28. For example, after transmitting network access request 28 to load balance unit 22, a retry timer, if included in serving node 18, may cause serving node 18 to transmit a repeated network access request 28. By accessing stored mapping information 110, processor 102 of load balance unit 22 may determine whether a received network access request 28 is an initial or a repeated request. To make this determination, processor 102 searches mapping information 110 for an entry indicating the particular mobile node 12 requesting access to the same data network 16. For example, if processor 102 of load balance unit 22 does not find an entry in mapping information 110 for the mobile node identifier included in network access request 28, processor 102 determines that network access request 28 is an initial request by mobile node 12 to obtain access to requested data network 16. Processor 102 then creates an entry for network access request 28. On the other hand, if processor 102 finds an entry in mapping information 110 for the mobile node identifier included in network access request 28, processor 102 determines that network access request 28 is a repeated request by mobile node 12.

For a repeated request, load balance unit 22 need not communicate with local domain name server 30 to request list 32 of gateways 20 providing access to requested data network 16. Because the IP address of the previously selected gateway 20 is stored in mapping information 110, processor 102 may simply modify network access request 28 to include the IP address of the previously selected gateway 20 and forward the modified network access request 28 to the previously selected gateway 20. This ensures that retransmitted network access requests 28 are not forwarded to different gateways 20.

According to particular embodiments, processor 102 also stores a time stamp for each entry in mapping information 110. Using the time stamps, processor 102 determines when to remove outdated entries from mapping information 110. To determine how long to maintain entries in mapping information 110, processor 102 may retrieve a time out value stored in configuration information 106 and compare it to the time stamp for an entry to determine whether the entry has become outdated. For example, if the time out value stored in configuration information 106 is set to twenty-five seconds, an entry in mapping information 110 may be removed or disregarded twenty-five seconds after the time recorded as the time stamp value. If used, the time out value should reflect the maximum time over which retransmissions of a network access request 28 can be expected.

For example, serving nodes 18 may use a retry timer and have a maximum number of retries. Thereafter, processor 102 should discard an entry from mapping information 110 only after an amount of time greater than or equal to the maximum number of retries multiplied by the retry timer value. If, for example, serving node 18 transmits a repeated network access request 28 four times after sending the initial network access request 28 and the retry timer is set to retransmit after five seconds, the time out value stored in configuration information 106 may be twenty-five seconds. Thus, processor 102 may compare the time stamp associated with an entry in mapping information 110 to a time out value of twenty-five seconds. If more than twenty-five seconds have passed since the entry was created, processor 102 may elect to disregard or remove the entry in mapping information 110. In this manner, memory 104 does not store outdated entries in mapping information 110. However, while particular examples are provided, processor 102 may use any suitable system for removing outdated entries.

While the embodiment illustrated and the preceding description focus on a particular embodiment of load balance unit 22 that includes specific elements, system 10 contemplates load balance unit 22 having any suitable combination and arrangement of elements for distributing network access requests 28 among gateways 20. Thus, the functionalities performed by the particular elements illustrated may be separated or combined as appropriate, and the functionalities of some or all of these elements may be implemented by logic encoded in media.

Figure 3:
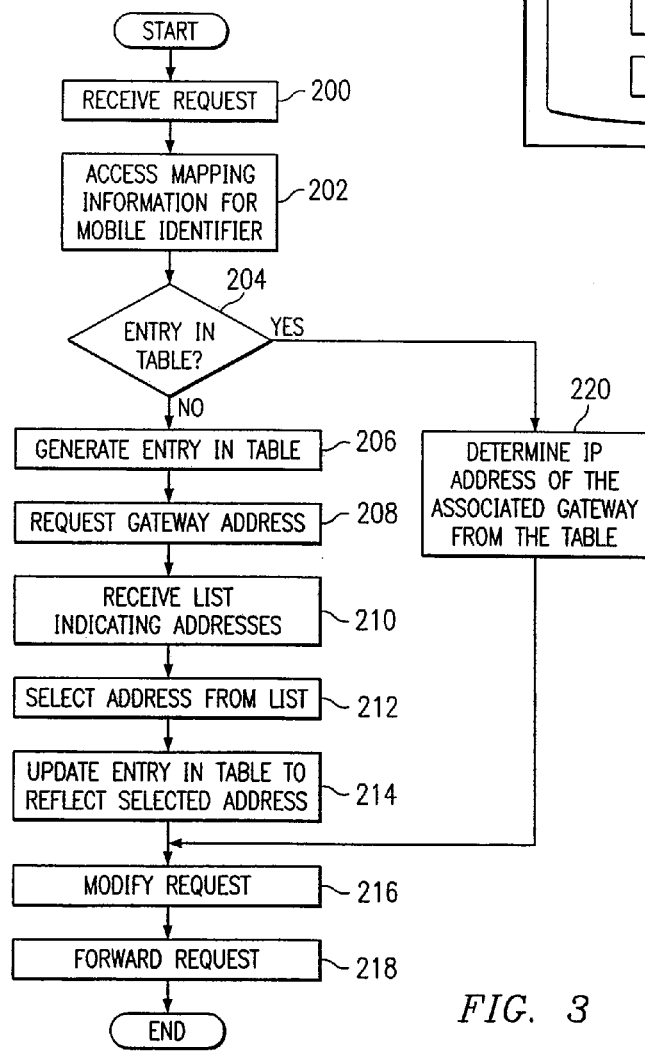
FIG. 3 illustrates an example method for load balancing network access requests from a mobile node based upon access point names.

FIG. 3 illustrates a method for load balancing network access requests 28 based upon APNs. The method begins at step 200 when load balance unit 22 receives network access request 28 from serving node 18, with network access request 28 identifying the APN of data network 16 which mobile node 12 seeks to access. At step 202, load balance unit 22 accesses mapping information 110 stored in memory 104 and determines at step 204 whether an entry exists in mapping information 110 for mobile node 12 indicated in network access request 28. If a matching entry is not found, load balance unit 22 generates an entry for the current network access request 28 at step 206. The entry may be generated by storing the mobile node identifier associated with mobile node 12 that is requesting access to requested data network 16.

At step 208, load balance unit 22 accesses local domain name server 30 and requests IP addresses for gateways 20 providing access to requested network 16 identified by the APN. Load balance unit 22 receives a response to network access request 28 at step 210. As previously discussed, the response lists one or more gateways 20 linking operator network 14 to requested data network 16. While not shown as a part of this example, load balance unit 22 may include logic for handling errors of local domain name server 30. Thus, if load balance unit 22 receives no response from local domain name server 30 or a response indicating no address, load balance unit 22 can signal an error to serving node 18. However, for this example, load balance unit 22 receives list 32 from local domain name server 30.

Load balance unit 22 selects one of gateways 20 from list 32 at step 212. For example, where round-robin or some other alternating technique for ordering gateways 20 is used to generate list 32, load balance unit 22 may select the first gateway 20 in list 32. At step 214, load balance unit 22 updates the entry in mapping information 110 that was created in step 206. To update the entry in mapping information 110, load balance unit 22 may map the IP address for selected gateway 20 to the mobile node identifier stored in mapping information 110. Load balance unit 22 modifies network access request 28 to include the IP address of selected gateway 20 and forwards network access request 28 to selected gateway 20 at steps 216 and 218, respectively.

Returning to step 204, if load balance unit 22 finds an entry in mapping information 110 for the mobile node identifier included in network access request 28, load balance unit 22 determines the destination IP address to which network access request 28 should be forwarded at step 220. Because the IP address of the previously selected gateway 20 is stored in mapping information 110, load balance unit 22 can modify network access request 28 at step 216 to include the IP address for the previously selected gateway 20. Load balance unit 22 forwards the modified network access request 28 to the previously selected gateway 20 at step 218. Thus, repeated network access requests 28 are forwarded to the same gateway 20 rather than to different gateways 20 providing access to requested data network 16.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. Logic for load balancing requests for communication channels, the logic embodied in a non-transitory computer-readable medium and operable to:
   maintain mapping information for previously processed network access requests;
   receive a network access request from a serving node linked to a radio access network, the network access request identifying a mobile node receiving wireless service from the radio access network and identifying a data network to which the mobile node has requested access, the network access request requesting a communication channel with the serving node for transporting data communications between the mobile node and the data network;
   determine one or more gateways providing access to the data network;
   use the mapping information to select one of the gateways providing access to the data network; and
   forward the network access request to the selected gateway.

2. The logic of claim 1, wherein determining one or more gateways providing access to the network comprises:
   determining the data network identified by the network access request;
   generating a domain name request identifying the data network;
   communicating the domain name request to a local domain name server; and
   receive a list of internet protocol (IP) addresses for the one or more gateways from the local domain name server.

3. The logic of claim 2, wherein selecting one of the gateways comprises selecting the first IP address in the list, such that rotating the positions of the addresses in subsequent domain name requests balances subsequent network access requests between the one or more gateways.

4. The logic of claim 1, wherein the network access request is an internet protocol (IP) packet having a source address for the serving node and a destination address indicating a load balance unit address configured within a public domain name server used by the serving node, the logic further operable to modify the destination address to indicate an IP address for the selected gateway.

5. The logic of claim 1, wherein the logic is further operable to select one of the gateways by performing a load balance based on gateway availability.

6. The logic of claim 1, wherein the mapping information indicates, for each of the previously processed network access requests, a mobile node associated with the previously processed network access request and an internet protocol (IP) address for a gateway selected for receiving the previously processed network access request.

7. The logic of claim 6, wherein the mapping information further indicates a time stamp for each of the previously processed network access requests, the logic further operable to remove expired entries from the mapping information based upon the time stamps.

8. The logic of claim 1, the logic further operable to:
   determine whether the mapping information includes an entry for the mobile node indicated in the network access request;
   if the mapping information does not include the entry for the mobile node, perform the steps of determining the one or more gateways providing access to the data network and select one of the gateways; and
   if the mapping information does include the entry for the mobile node, modify a destination address of the network access request to indicate the IP address of the gateway selected to receive the previously processed network access request indicating the mobile node.

9. The logic of claim 1, wherein the network access request is a create packet data protocol (PDP) context request generated by the serving node in response to a request generated by the mobile node, the create PDP context request comprising an access point name field indicating the data network, a mobile node identifier identifying the mobile node, an authentication method for use by the selected gateway, a user identifier identifying a user of the mobile node requesting the communication channel, and a password for the user of the mobile node.

* * * * *